W. SEIDEL.
WHEEL.
APPLICATION FILED OCT. 7, 1916.

1,289,936.

Patented Dec. 31, 1918.
2 SHEETS—SHEET 1.

Witness:
Harry S. Gaither

Inventor.
William Seidel
by Fleming & Fleming
Attys

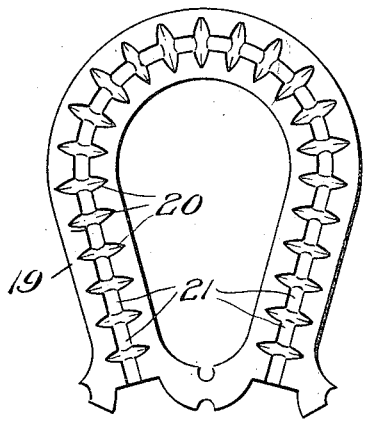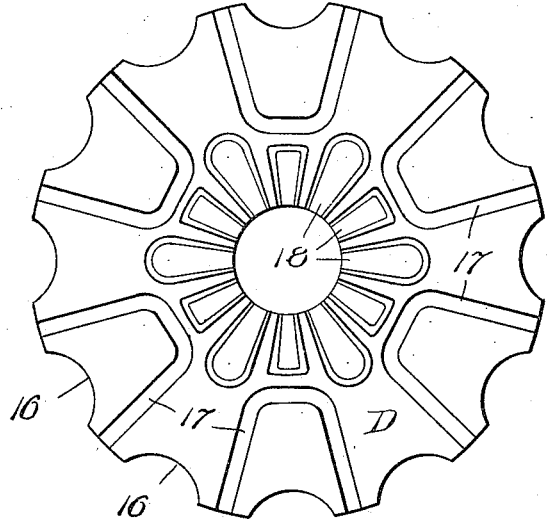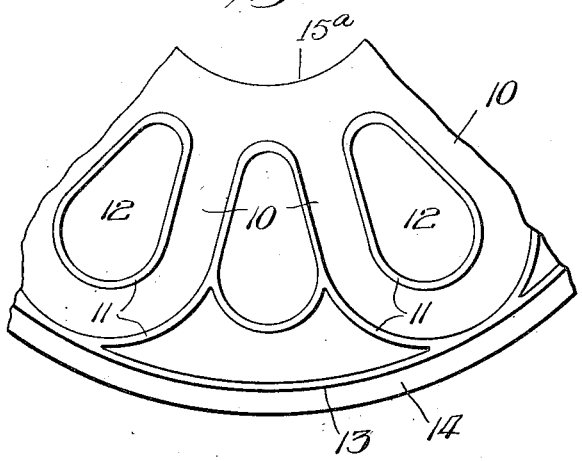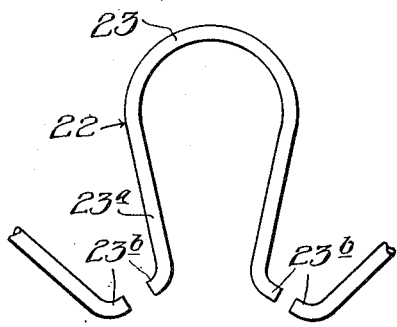

UNITED STATES PATENT OFFICE.

WILLIAM SEIDEL, OF CHICAGO, ILLINOIS.

WHEEL.

1,289,936.  Specification of Letters Patent.  Patented Dec. 31, 1918.

Application filed October 7, 1916.  Serial No. 124,361.

*To all whom it may concern:*

Be it known that I, WILLIAM SEIDEL, a citizen of the United States, residing in Chicago, county of Cook, and State of Illinois, have invented certain new and useful Improvements in Wheels, of which the following is a specification.

This invention relates to an improved vehicle wheel construction, the principal objects being simplicity, cheapness, lightness, strength, and resiliency. My invention includes also numerous other objects, as will more fully hereinafter appear from the specification and claims, and from the accompanying drawings, in which:—

Fig. 3 is a detail of one of the rubber cushions which impart resiliency to the wheel;

Fig. 4 is a detail view of one of the hub sections of the wheel;

Fig. 5 is a detail interior view of a portion of one of the wheel casings, the rubber cushions being removed from the figure; and Fig. 6 is a detail view of one of the wheel spokes.

Figure 1:
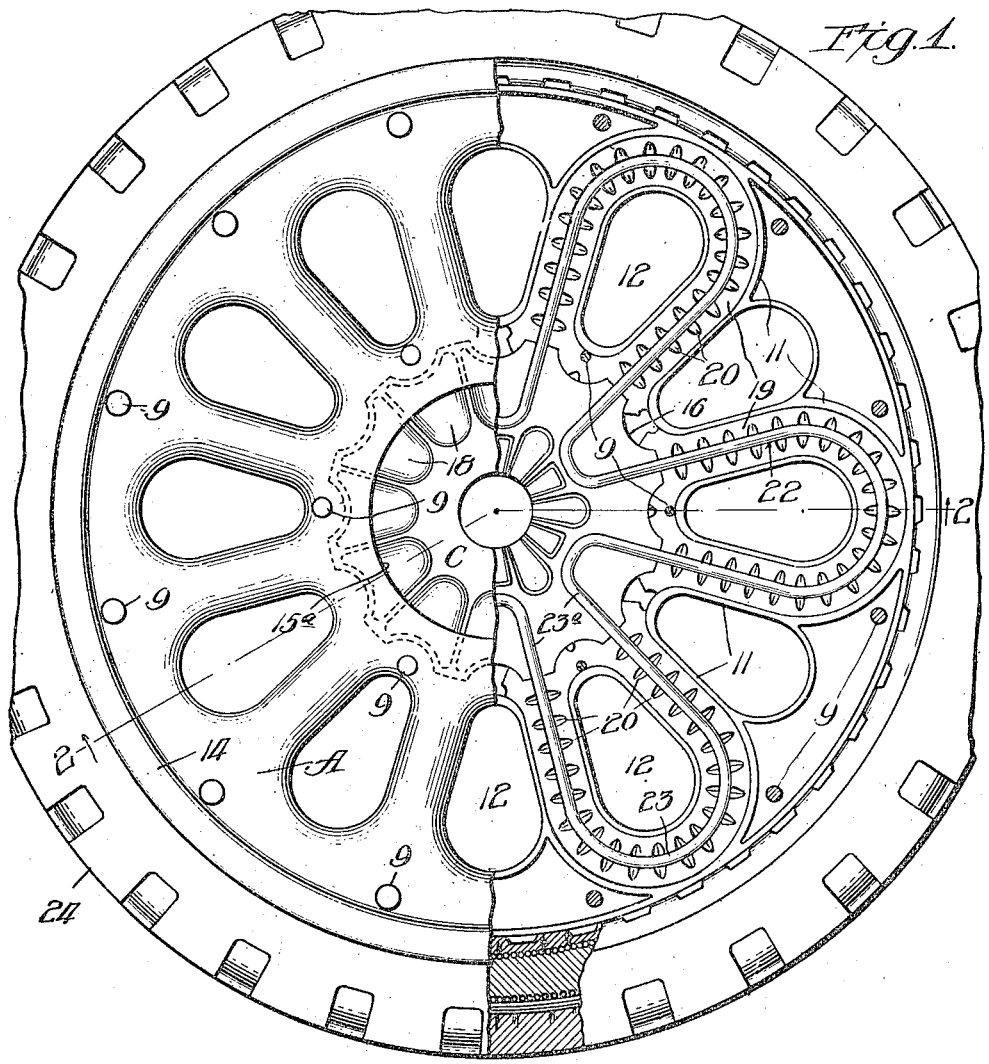
Figure 1 is a partial side elevation and partial section of a wheel embodying my invention.
Figure 2:
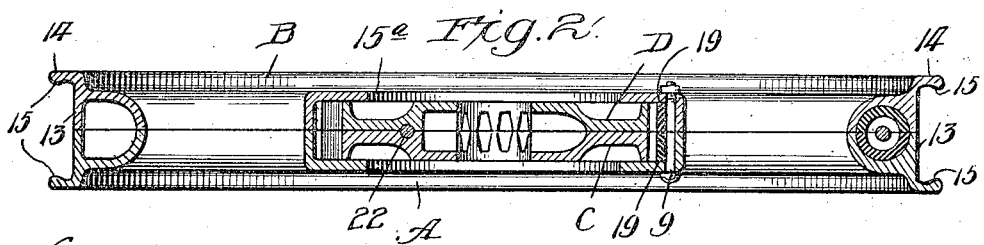
Fig. 2 is a cross-section through the wheel with the tire removed, taken on line 2—2 of Fig. 1.

The several parts of the present wheel are housed within two complementary casing or shell sections A and B, secured together by suitable bolts 9 or otherwise. Each of the casing sections may conveniently be formed of a light material such as aluminum. Interiorly each of these sections may be shaped to provide a number of looped courses 10 bordered with flanges or walls 11, the spaces within and between the looped courses being open as at 12. In the wheel illustrated six looped courses are provided, this being a convenient and serviceable number. Around the rim or periphery 13 of the wheel casings flanges 14 are provided, each of these flanges being slightly inturned near its outer edge as at 15 to retain between them a tire 24.

The casings A and B terminate inwardly in a circular wall 15ª, within which the complementary hub sections C and D are arranged. These hub sections are slightly less in diameter than the clearance space in the wheel center interiorly of the flanges of the looped courses. The hub sections C and D are, therefore, capable of a limited movement within the wheel for the purpose of absorbing shocks, etc. By any appropriate means the hub sections may be secured together and to the axles of a vehicle.

The peripheries of the hub sections are notched at intervals as at 16 to present a peripheral configuration harmonizing somewhat with the configuration within the casing sections resulting from the presence of the flanges 11. Within each of the hub sections U-shaped courses or grooves 17 are arranged and centered with respect to the looped courses in the casing sections. Other recessed portions 18 are provided principally to economize on material and weight.

Within the looped courses provided in the casing sections, I have arranged cushions 19, which may also be formed in two sections, one fitted to lie within each of the casing sections. For purposes of reducing weight, as well as providing spaces into which the material may more easily be displaced when compressed, pockets 20 may be formed in these cushions, preferably in the manner indicated in Figs. 1 and 3. These cushions are preferably formed of a resilient material such as rubber, or a rubber composition. Extending centrally within each cushion is a course or groove 21 intercepted at intervals by the pockets 20. Each of the cushions, as appears best in Fig. 3, is of a general horse-shoe shape with a bridge or web connecting the converging ends. Six of these cushions would be required for a wheel formed with six looped courses, such as is represented in the drawings.

I have connected the casing and hub sections by means of spokes 22 which may be formed of heavy wire, or the like. These spokes are each formed with a looped portion 23 (see Fig. 6) arranged to lie within the central course or groove in a rubber cushion, the straight end portions 23ª of the spokes being fitted into the courses or grooves 17 within the hub section. In the arrangement shown in Fig. 1 I have used a single continuous spoke bent to provide six loops, one of which will lie within each of the rubber sections for the purpose of affording a connection between the casing and hub sections of the wheel. It is entirely possible, however, to employ a number of spokes such as are shown in Fig. 6, each of which is configured to lie within one rubber cushion and the hub courses 17 adjacent thereto. The spoke extremities 23^b are bent around in the manner shown in Fig. 6 to lock the spokes securely within the hub section. The two hub sections may be bolted or otherwise secured together, and be retained centrally within the wheel between the casing sections A and B.

In the construction of the present wheel mention has been made of numerous courses or grooves provided within each section composing the casing, hub, and cushion. Since the wheel when assembled requires that each of these sections be joined to a complementary section provided with similar grooves or courses, it follows that these courses will be completely closed in and take on the characteristics of passages. In the completed wheel the hub sections are free to float within its central portion. The spokes and cushions, however, tend to keep the hub centered in the wheel, so that every portion of the rim normally remains equidistant from the axis.

The entire wheel of my invention possesses lightness, strength and resiliency, is ornamental and attractive in appearance, and can be used without danger from heat or other causes.

I claim:

1. A vehicle wheel comprising, in combination, a hollow casing consisting of two complementary sections each formed peripherally with a flange between which a tire may be mounted, means for securing the casing sections together, the sections when joined providing between them a plurality of looped channels extending in part in directions radially of the wheel, a cushion arranged within each of the looped passages, each of the cushions being provided with a central passage therewithin, a hub arranged centrally of the wheel consisting of two complementary sections providing between them passages corresponding in position to the passages within the cushions, and spokes extended within the cushion and hub passages, substantially as described.

2. A vehicle wheel comprising, in combination, a hollow casing within which is provided a number of radially arranged channels, every other channel being connected with the adjacent channel on one side to provide a loop, loop-shaped cushions arranged within the channels, there being a central passage within each of the cushions, a hollow hub arranged centrally of the wheel having a plurality of passages therein corresponding in position to the passages within the cushions, and spokes extended within the cushion and hub passages, substantially as described.

3. A vehicle wheel comprising, in combination, a hollow casing having interiorly arranged channels disposed radially of the wheel, the spaces between the channels being open through the wheel casing, every other radial channel being connected with the adjacent channel on one side to provide a loop, loop-shaped cushions arranged within the channels, there being a plurality of transversely arranged pockets within each cushion and a passage extending centrally through the cushion and transverse pockets, a hollow hub arranged centrally of the wheel, the hub being provided with a number of U-shaped passages each having a straight portion arranged radially of the wheel and corresponding in number and position to the passages within the cushions, and a single continuous spoke extended through each of the cushion and hub passages, substantially as described.

4. A vehicle wheel comprising, in combination, a hollow casing consisting of two complementary sections, means for securing the casing sections together, the sections when joined providing between them a number of radially arranged channels, every other channel being connected with the adjacent channel on one side to provide a loop, loop-shaped cushions arranged within the channels, there being a central passage within each of the cushions, a hollow hub arranged centrally of the wheel having a plurality of passages therein corresponding in number to the passages within the cushions, and spokes extended within the cushion and hub passages, substantially as described.

5. A vehicle wheel comprising, in combination, a hollow casing consisting of two complementary sections, means for securing the casing sections together, the sections when joined providing between them closed channels disposed radially of the wheel, the spaces between the channels being open through the wheel casing, every other radial channel being connected with the adjacent channel on one side to provide a loop, loop-shaped cushions arranged within the channels, there being a plurality of transversely arranged pockets within each cushion and a passage extending centrally through the cushion and transverse pockets, a hollow hub arranged centrally of the wheel, the hub being provided with a number of U-shaped passages each having a straight portion arranged radially of the wheel and corresponding in number and position to the passages within the cushions, and a single continuous spoke extended through each of the cushion and hub passages, substantially as described.

6. A vehicle wheel comprising, in combination, a hollow casing having interiorly arranged channels disposed radially of the wheel, every other radial channel being connected with the adjacent channel on one side to provide a loop, loop-shaped cushions arranged within the channels, there being a plurality of transversely arranged pockets within each cushion and a passage extending centrally through the cushion and transverse pockets, a hollow hub arranged centrally of the wheel, the hub being provided with a number of U-shaped passages each having a straight portion arranged radially of the wheel and corresponding in number and position to the passages within the cushions, and a single continuous spoke extended through each of the cushion and hub passages, substantially as described.

7. A vehicle wheel comprising, in combination, a hollow casing, a hub movable radially of the casing and normally partially inclosed therewithin, and resilient means for maintaining the hub in a position normally centrally of the wheel, consisting of looped cushions arranged within the wheel casing, and looped spokes adapted to coöperate with the cushions, the ends of each spoke being secured to the hub, substantially as described.

8. A vehicle wheel comprising, in combination, a hollow casing, a hollow hub partially inclosed within the wheel casing, and resilient means for maintaining the hub in a position normally centrally of the wheel consisting of a plurality of loop-shaped cushions fixedly secured within the wheel casing, each of the cushions having a central passage therethrough, and the hub being formed with passages registering with the cushion passages, and spokes extended through the hub and cushion passages, substantially as described.

9. A vehicle wheel comprising, in combination, a hollow casing, a hub movable radially of the casing, and resilient means for maintaining the hub in a position normally centrally of the wheel, consisting of a plurality of looped cushions within the wheel casing arranged in a single plane, and a looped spoke having its ends secured to the hub adapted to coöperate with each cushion, substantially as described.

10. A vehicle wheel comprising, in combination, a hollow casing, a hub movable radially of the casing, and resilient means for maintaining the hub in a position normally centrally of the wheel, consisting of looped cushions arranged within the wheel casing, and looped spokes within the cushions having their ends secured to the hub, substantially as described.

WILLIAM SEIDEL.

Copies of this patent may be obtained for five cents each, by addressing the "Commissioner of Patents, Washington, D. C."